United States Patent
Graham et al.

(10) Patent No.: US 10,007,545 B2
(45) Date of Patent: Jun. 26, 2018

(54) DYNAMIC ALTERING OF SRIOV VIRTUAL FUNCTION (VF) RESOURCES INCLUDING DMA WINDOWS WITHOUT BRINGING DOWN THE VF

(71) Applicant: International Business Machines Corporation, Armonk, NY (US)

(72) Inventors: Charles S. Graham, Rochester, MN (US); Rama K. Hazari, Hyderabad (IN); Sakethan R. Kotta, Hyderabad (IN); Kumaraswamy Sripathy, Hyderabad (IN); Nuthula Venkatesh, Telangana (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/070,410

(22) Filed: Mar. 15, 2016

(65) Prior Publication Data

US 2017/0269952 A1 Sep. 21, 2017

(51) Int. Cl.
*G06F 13/36* (2006.01)
*G06F 9/455* (2018.01)
*G06F 13/28* (2006.01)
*G06F 13/16* (2006.01)

(52) U.S. Cl.
CPC ...... *G06F 9/45558* (2013.01); *G06F 13/1673* (2013.01); *G06F 13/28* (2013.01); *G06F 2009/45579* (2013.01); *G06F 2009/45583* (2013.01)

(58) Field of Classification Search
CPC .. G06F 9/45558; G06F 13/1673; G06F 13/28; G06F 2009/45583; G06F 2009/45579
See application file for complete search history.

(56) References Cited

U.S. PATENT DOCUMENTS

| 9,092,366 | B2 | 7/2015 | King et al. | |
|---|---|---|---|---|
| 9,535,740 | B1* | 1/2017 | Graham | G06F 9/45558 |
| 2010/0262727 | A1* | 10/2010 | Arndt | G06F 13/28 |
| | | | | 710/22 |
| 2012/0151472 | A1 | 6/2012 | Koch et al. | |
| 2012/0151473 | A1* | 6/2012 | Koch | G06F 9/45558 |
| | | | | 718/1 |

(Continued)

OTHER PUBLICATIONS

Anonymously; "Single Route I/O Virtualization—Dynamic Network Optimizer"; An IP.com Prior Art Database Technical Disclosure; http://ip.com/IPCOM/000231850; Undated.

(Continued)

*Primary Examiner* — Jing-Yih Shyu
(74) *Attorney, Agent, or Firm* — Joan Pennington (57) ABSTRACT

A method, system and computer program product are provided for implementing dynamic altering of a Single Root Input/Output Virtualization (SRIOV) virtual function (VF) resources including direct memory access (DMA) windows without bringing down the VF in a virtualized system. A request to alter VF resources is received, such as a dynamic request based on usage statistics or change in need of the user. Pending DMA requests are completed for the VF resources to be altered. Responsive to completing the DMA requests, new buffers are allocated for the resized DMA windows without bringing down the VF in a virtualized system.

18 Claims, 10 Drawing Sheets

(56) References Cited

U.S. PATENT DOCUMENTS

| | | | | |
|---|---|---|---|---|
| 2012/0331260 A1* | 12/2012 | Arroyo | ............... | G06F 13/28 |
| | | | | 711/206 |
| 2013/0160002 A1* | 6/2013 | Graham | ............ | G06F 9/45558 |
| | | | | 718/1 |
| 2013/0305243 A1* | 11/2013 | Hiki | .................. | G06F 9/5077 |
| | | | | 718/1 |
| 2014/0007097 A1* | 1/2014 | Chin | ............... | G06F 9/45533 |
| | | | | 718/1 |
| 2014/0372795 A1 | 12/2014 | Graham et al. | | |
| 2015/0149995 A1 | 5/2015 | Arroyo et al. | | |
| 2016/0170790 A1* | 6/2016 | Anand | ............. | G06F 9/45558 |
| | | | | 718/1 |
| 2016/0179562 A1* | 6/2016 | Kaneko | ............ | G06F 9/45558 |
| | | | | 718/1 |
| 2016/0266821 A1* | 9/2016 | Sathyanarayan | ... | G06F 12/0638 |
| 2017/0220366 A1* | 8/2017 | Crowe | ............. | G06F 9/45508 |

OTHER PUBLICATIONS

Anonymously; "A system and method to dynamically alter the virtual hardware resource of instance in cloud"; http://ip.com/IPCOM/000227682; Undated.

Anonymously; "VM Migration based on multi criterion ranking of Hypervisors and Virtual Machines in Software Defined Data Center (SDDC) Environments"; http://ip.com/IPCOM/00024063; Undated.

* cited by examiner

| TCE TABLE START ADDR 302 | TABLE SIZE 304 | LIOBN 306 | RESERVED 308 |
|---|---|---|---|

| TCE TABLE START ADDR 302 | TABLE SIZE 304 | LIOBN 306 | DUALWRITE MODE 312 | DESTINATION TCE TABLE ADDR 314 |
|---|---|---|---|---|

| 700 | 720 | 730 | 740 |
|---|---|---|---|
| VF7 1GB 716 | VF7 1GB 716 | VF7 1GB 716 | VF7 1GB 716 |
| VF6 2GB 714 | VF6 1GB 722 | VF6 1GB 722 | VF6 1GB 722 |
| | FREE 1GB 724 | VF1 2GB 704 | VF1 2GB 704 |
| VF5 1GB 712 | VF5 1GB 712 | | |
| VF4 1GB 710 | VF4 1GB 710 | VF4 1GB 710 | VF4 1GB 710 |
| VF3 1GB 708 | VF3 1GB 708 | VF3 1GB 708 | VF3 1GB 708 |
| VF2 2GB 706 | VF2 2GB 706 | VF2 2GB 706 | VF2 2GB 706 |
| VF1 2GB 704 | VF1 2GB 704 | VF5 1GB 712 | VF5 1GB 712 |
| | | FREE 1GB 732 | VF0 3GB 742 |
| VF0 2GB 702 | VF0 2GB 702 | VF0 2GB 702 | |

DYNAMIC ALTERING OF SRIOV VIRTUAL FUNCTION (VF) RESOURCES INCLUDING DMA WINDOWS WITHOUT BRINGING DOWN THE VF

FIELD OF THE INVENTION

The present invention relates generally to the data processing field, and more particularly, relates to a method, system and computer program product for implementing dynamic altering of a Single Root Input/Output Virtualization (SRIOV) virtual function (VF) resources including direct memory access (DMA) windows in a SRIOV adapter without bringing down the VF.

DESCRIPTION OF THE RELATED ART

Single root input/output (TO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

In the existing art, some SRIOV resources cannot be dynamic allocated and redistributed without bringing the VFs down. Direct memory access (DMA) Windows, which is memory an adapter may DMA into and out of, are one of these resources.

Translation Control Entry (TCE) tables provide protection and mapping of PCI addresses to system memory during adapter DMA operations. The number of TCE entries in a TCE table determine the DMA window size. For SRIOV enabled adapters, the adapter TCE table is subdivided into multiple TCE tables. Each table can be assigned to an SR-IOV virtual functions (VFs). Current art for TCE Tables require a TCE Table to reside in consecutive memory. In addition, a TCE table must have nodal affinity to provide optimal performance. These requirements limit the ability to dynamically alter a VF's DMA Windows. It could be possible either with bringing down multiple or all the VFs based on the position of the VFs requiring the alteration and reconfiguring all DMA windows accordingly, or bringing down adjacent VFs and splitting/merging DMA Windows. In either case the VFs has to be brought down, which will affect the corresponding logical partitions (LPARs') traffic.

A need exists for an effective mechanism to implement dynamic altering of a Single Root Input/Output Virtualization (SRIOV) virtual function (VF) resources including direct memory access (DMA) windows in a SRIOV adapter. It is desirable that such mechanism enables effective and efficient utilization of the SRIOV virtual functions requiring the alteration of DMA windows without bringing down the VF.

SUMMARY OF THE INVENTION

Principal aspects of the present invention are to provide a method, system and computer program product for implementing dynamic altering of a Single Root Input/Output Virtualization (SRIOV) virtual function (VF) resources including direct memory access (DMA) windows without bringing down the VF in a virtualized system. Other important aspects of the present invention are to provide such method, system and computer program product substantially without negative effects and that overcome many of the disadvantages of prior art arrangements.

In brief, a method, system and computer program product are provided for implementing dynamic altering of a Single Root Input/Output Virtualization (SRIOV) virtual function (VF) resources including direct memory access (DMA) windows without bringing down the VF in a virtualized system. A request to alter VF resources is received, such as a dynamic request based on usage statistics or change in need of the user. Pending DMA requests are completed for the VF resources to be altered. Responsive to the completed DMA requests, new buffers are allocated for the resized DMA windows without bringing down the VF in a virtualized system.

In accordance with features of the invention, a management function, a hypervisor, and a partition based virtual function (VF) device driver are used to implement methods for dynamic altering of the SRIOV virtual function (VF) resources. Translation Control Entry (TCE) tables provide protection and mapping of PCI addresses to system memory during adapter DMA operations.

In accordance with features of the invention, an enhanced Translation Control Entry (TCE) table enables TCE table migration for dynamically altering DMA windows without affecting live traffic on the VFs being altered. Each entry of the TCE table includes a Dual Write Mode field and a Destination TCE Table Address field.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing dynamic altering of a Single Root Input/Output Virtualization (SRIOV) virtual function (VF) resources including direct memory access (DMA) windows in a SRIOV adapter.

Figure 1:
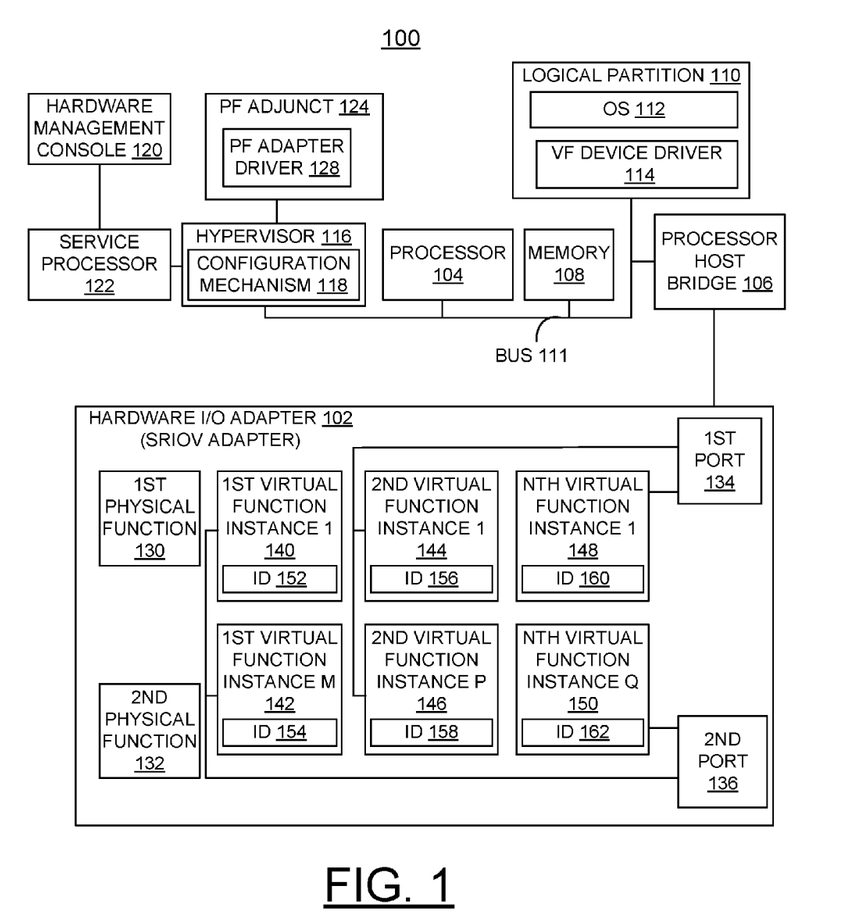
FIG. 1 illustrates an example computer system for implementing dynamic altering of a Single Root Input/Output Virtualization (SRIOV) virtual function (VF) resources including direct memory access (DMA) windows without bringing down the VF in a virtualized system in accordance with the preferred embodiment.

Having reference now to the drawings, in FIG. 1, there is shown an example computer system generally designated by the reference character 100 for implementing dynamic altering of a Single Root Input/Output Virtualization (SRIOV) virtual function (VF) resources including direct memory access (DMA) windows without bringing down the VF in a SRIOV adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer system 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102, for example, based on configuration information provided by a system administrator via the hardware management console 120, and for dynamic virtual function (VF) resizing based on VF usage in accordance with the invention.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 130, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2A:
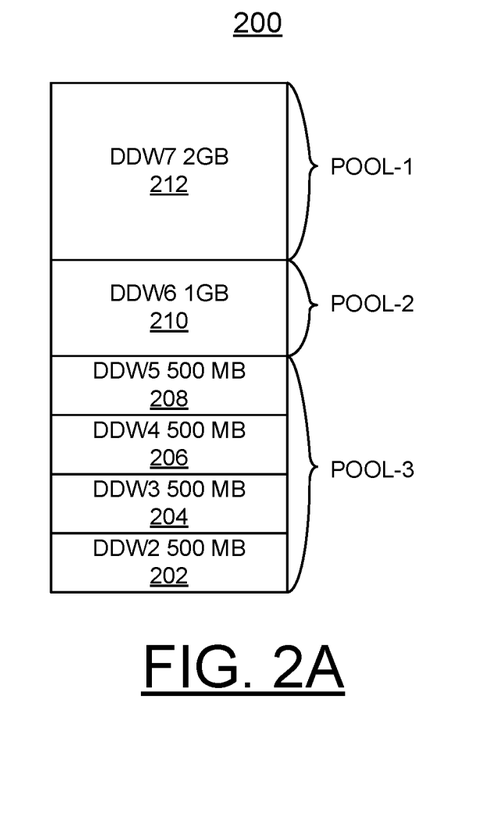
FIGS. 2A, and 2B respectively illustrate an example standard memory TCE table pool arrangement for DMA windows and an example memory TCE table pool arrangement for DMA windows for implementing dynamic altering of Single Root Input/Output Virtualization (SRIOV) virtual function (VF) resources including direct memory access (DMA) windows without bringing down the VF for the SRIOV adapter in accordance with the preferred embodiment.
Figure 2B:
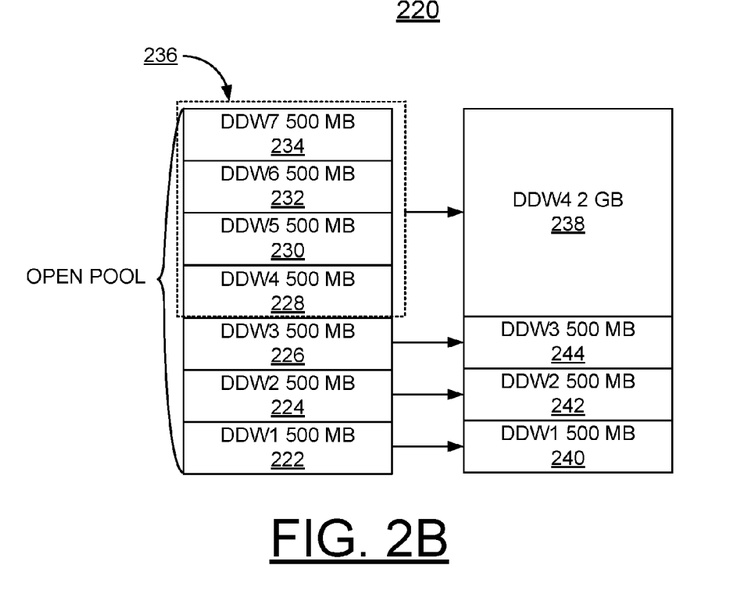

Referring to FIGS. 2A, and 2B, there are respectively shown an example standard memory TCE table pool arrangement for DMA windows generally designated by the reference character 200 and an example memory TCE table pool arrangement for DMA windows generally designated by the reference character 220 for implementing dynamic altering of Single Root Input/Output Virtualization (SRIOV) virtual function (VF) resources for the SRIOV adapter in accordance with the preferred embodiment.

In FIG. 2A, the example current implementation pools 200 of TCE tables are created to accommodate the need for VFs with different capabilities (i.e. capacities). This means the total TCE table size for an adapter must be larger than what is required to drive the adapter's physical port bandwidth. As shown TCE table pool arrangement 200 includes three pools, pool-1, pool-2, and pool-3. Pool-3 includes DDW2-DDW5, 202, 204, 206, 208, each 500 MB, Pool-2 includes DDW6, 210, 1 GB, and Pool-1 includes DDW7, 212, 2 GB for a total of 5 GB. For example, if it takes a 2 GB DMA window to drive a 10 Gb Ethernet link and 4 VFs need to be supported on the port, current approach might do something as shown in FIG. 2A to allow 4 VFs with different capacity settings.

In FIG. 2B, the example new memory TCE table pool arrangement 220 for DMA windows is shown for implementing dynamic altering of Single Root Input/Output Virtualization (SRIOV) virtual function (VF) resources for the SRIOV adapter in accordance with the preferred embodiment. The new memory TCE table pool arrangement 220 includes one pool including DDW1-DDW7, 222, 224, 226, 228, 230, 232, 234, each 500 MB for a total of 3.5 GB. If there is a way to do garbage collection or TCE table migration without bringing VFs down, then the same capability can be achieved with a 3.5 GB (7*500 MB) window, rather than the 5 GB of FIG. 2A. As indicated by the reference character 236, four DDW4-DDW7, 228, 230, 232, 234 are combined to provide DDW4 238, 2 GB, and three DDW1-DDW3, 222, 224, 226 provide 500 MB DDW1-DDW3, 240, 242, 244. For example, if we assume a minimum size of a 500 MB DMA window then the worst case is one VF with 97% capacity using a 2 GB window and 3 VFs with 1% capacity using a 500 MB window each for a total of 1.5 GB in accordance with the preferred embodiment. So with the garbage collection or TCE Table Migration it requires substantially less TCE table space, i.e., 3.5 GB shown in FIG. 2B, in accordance with the preferred embodiment, vs 5 GB DMA window shown in FIG. 2A.

Figure 3A:
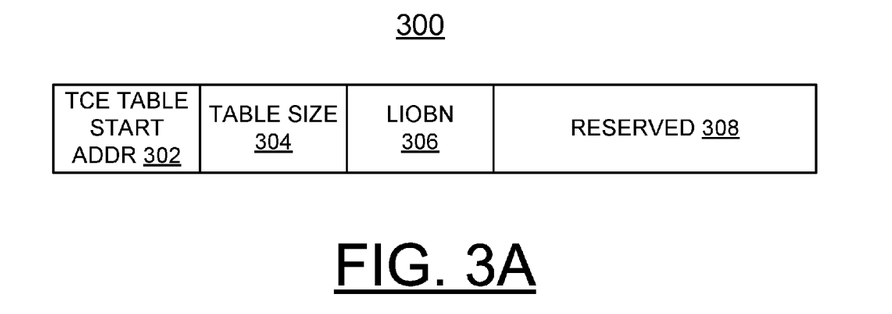
FIGS. 3A, and 3B respectively illustrate an example standard Translation Control Entry (TCE) table header and an example enhanced Translation Control Entry (TCE) table header for implementing dynamic altering of Single Root Input/Output Virtualization (SRIOV) virtual function (VF) resources for the SRIOV adapter in accordance with the preferred embodiment.
Figure 3B:
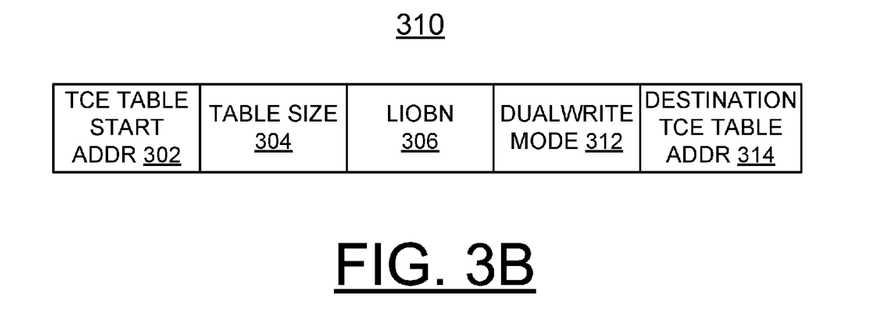

Referring to FIGS. 3A, and 3B, there are respectively shown an example standard Translation Control Entry (TCE) table header generally designated by the reference character 300 and an example enhanced Translation Control Entry (TCE) table header generally designated by the reference character 310 for implementing dynamic altering of Single Root Input/Output Virtualization (SRIOV) virtual function (VF) resources for the SRIOV adapter in accordance with the preferred embodiment. The Translation Control Entry (TCE) tables provide protection and mapping of PCI addresses to system memory during adapter DMA operations. The standard Translation Control Entry (TCE) table header 300 includes a TCE table start address 302, a table size 304, LIOBN (logical IO bus number) 306 and reserved field 308. The enhanced Translation Control Entry (TCE) table header 310 includes a TCE table start address 302, a table size 304, LIOBN (logical IO bus number) 306, and new fields DualWriteMode 312, and Destination TCE Table Address 314, which are used in the TCE Table migration in accordance with the preferred embodiment.

Figure 4:
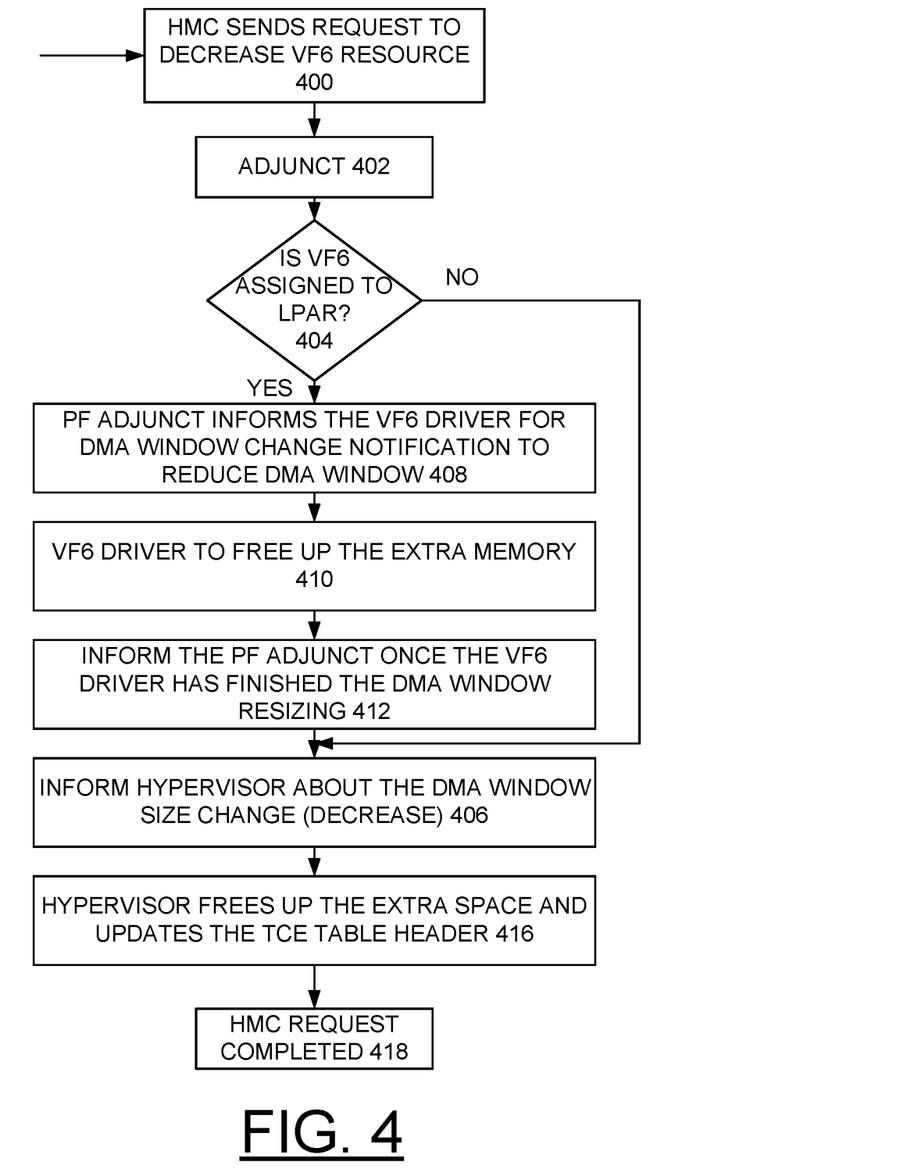
FIGS. 4, and 5 together provide a flow chart illustrating example operations for implementing dynamic altering of Single Root Input/Output Virtualization (SRIOV) virtual function (VF) resources including direct memory access (DMA) windows without bringing down the VF for the SRIOV adapter in accordance with the preferred embodiment.
Figure 5:
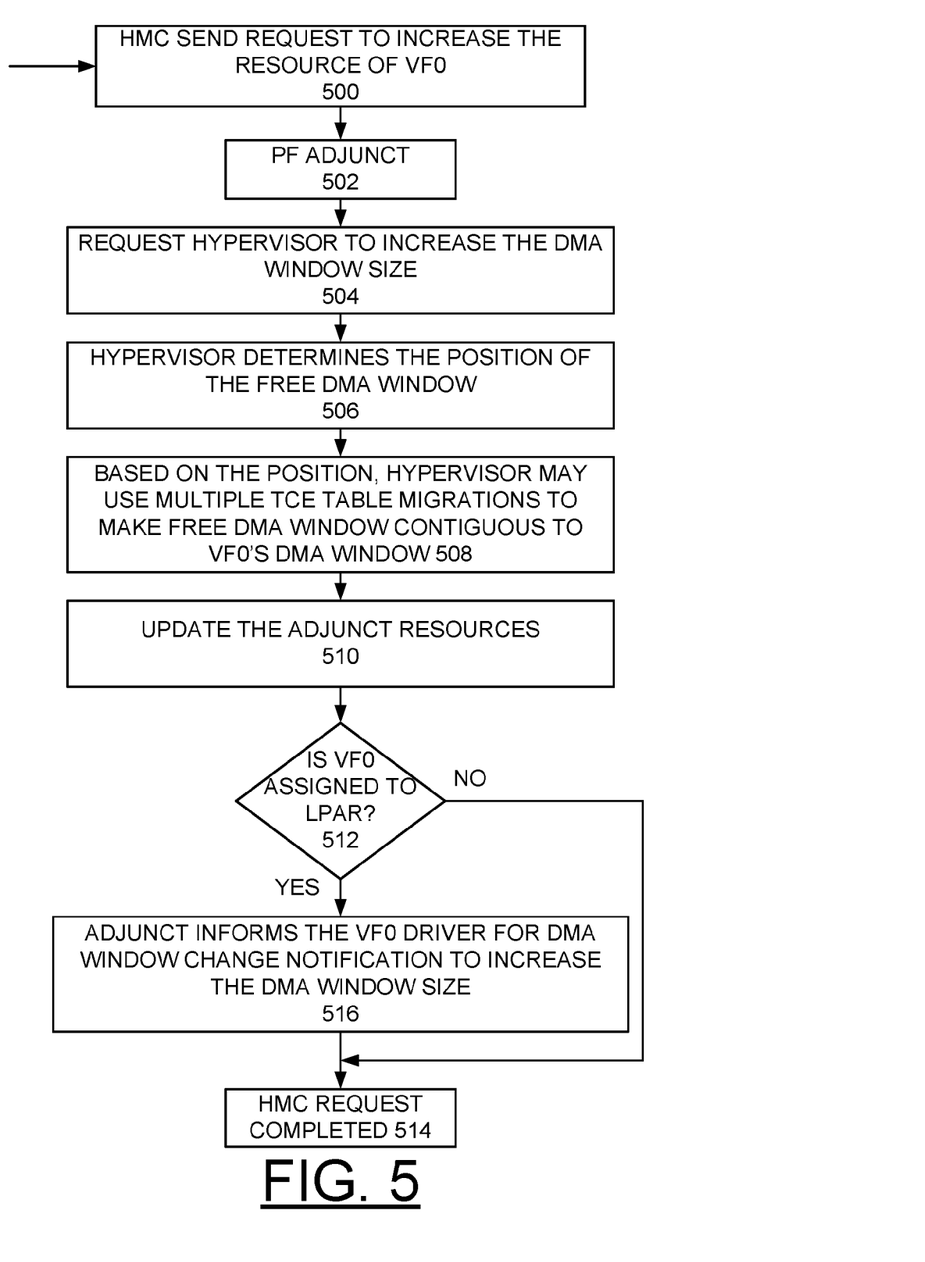

Referring to FIGS. 4, and 5, there are shown example operations for implementing dynamic altering of Single Root Input/Output Virtualization (SRIOV) virtual function (VF) resources for the SRIOV adapter in accordance with the preferred embodiment. Increased flexibility is provided to customers to reduce/increase the VF resources as per their needs without bringing the VFs down. Using the TCE Table migration, instead of multi-level TCE Table for consolidating the DMA windows maintains TCE accessing performance. For freeing up the DMA window, VF driver has to wait until the pending DMA requests are completed, and then the VF driver can allocate new buffers in the resized DMA Window. This is eliminating the need for the VF to go down.

As indicated at a block 400, a management layer or HMC sends a request to decrease VF6 resource. A PF adjunct receives the request from the management layer as indicated at a block 402. Checking whether the VF6 is assigned to an LPAR (logical partition) is performed as indicated at a decision block 404. If the VF6 is not assigned to an LPAR, the hypervisor is notified about the DMA window size change or decrease as indicated at a block 406. Otherwise if the VF6 is assigned to an LPAR, the PF adjunct informs the VF6 driver for the DMA window change notification to reduce the DMA window as indicated at a block 408. The VF6 driver acts to free up the extra memory as indicated at a block 410. The VF6 driver informs the PF adjunct once the VF6 driver has finished the DMA window resizing as indicated at a block 412. Then the hypervisor is notified about the DMA window size change or decrease at block 406. The hypervisor frees up the extra space and updates the TCE table header as indicated at a block 416. The request from the management layer is completed as indicated at a block 418.

In FIG. 5 as indicated at a block 500, a management layer or HMC sends a request to increase the VF0 resource. The steps of FIG. 5 enable increasing the resources for a VF dynamically. This operation is allowed in HMC only if free resources or capacity is available, that is the management layer or HMC has to free up the resources prior to this operation.

A PF adjunct receives the request from the management layer as indicated at a block 502. The hypervisor is requested to increase the DMA window size as indicated at a block 504. The hypervisor determines the position of the free DMA window as indicated at a block 506. Then based on position, the hypervisor may use multiple TCE table migrations to make free DMA window contiguous to VF0's DMA as indicated at a block 508. The hypervisor updates the adjunct resources as indicated at a block 510. Checking whether the VF0 is assigned to an LPAR (logical partition) is performed as indicated at a decision block 512. If the VF0 is not assigned to an LPAR, the request from the management layer is completed as indicated at a block 514. Otherwise if the VF0 is assigned to an LPAR, the PF adjunct informs the VF0 driver for the DMA window change notification to increase the DMA window as indicated at a block 516. The request from the management layer is completed at block 514.

Figure 6:
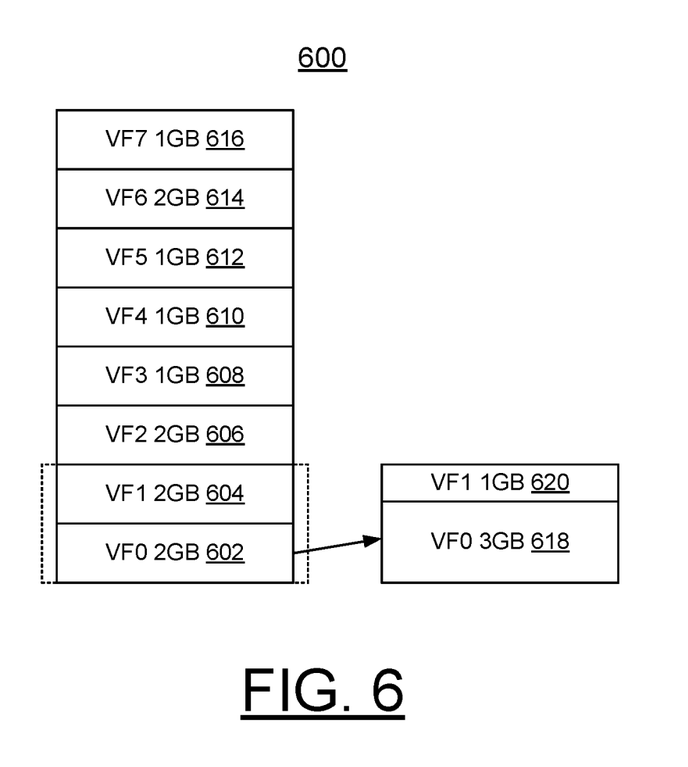
FIG. 6 illustrates an example memory TCE table pool arrangement for DMA windows for implementing dynamic altering of Single Root Input/Output Virtualization (SRIOV) virtual function (VF) resources for the SRIOV adapter including modifying resources of adjacent VFs, which in accordance with the preferred embodiment.

Referring to FIG. 6, there is shown an example memory TCE table pool arrangement generally designated by the reference character 600 for DMA windows for implementing dynamic altering of Single Root Input/Output Virtualization (SRIOV) virtual function (VF) resources for the SRIOV adapter including modifying resources of adjacent VFs, which in accordance with the preferred embodiment. The memory TCE table pool arrangement 600 includes VF0-VF7, 602, 604, 606, 608, 610, 612, 614, 616. As shown, more resources are required for VF0, and VF1 is unassigned to any LPAR, enabling a target configuration of VF0 3 GB, 618 and VF1 1 GB, 620, with modifying the resources of adjacent VFs, which does not involve any TCE table migration.

Figure 7A:
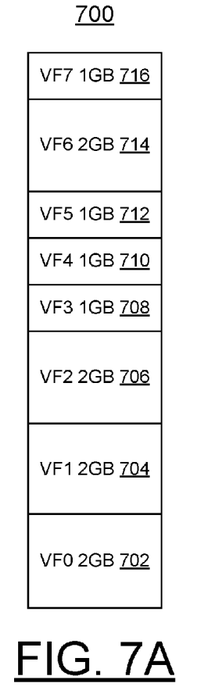
FIGS. 7A, 7B, 7C and 7D illustrate example operations for implementing dynamic altering of Single Root Input/Output Virtualization (SRIOV) virtual function (VF) resources for the SRIOV adapter, with modifying resources of VFs whose DMA windows are not adjacent, which involves multiple TCE Table migrations in accordance with the preferred embodiment.
Figure 7B:
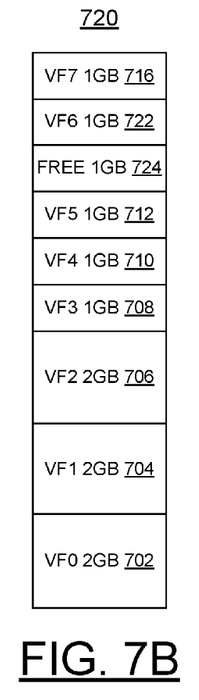
Figure 7C:
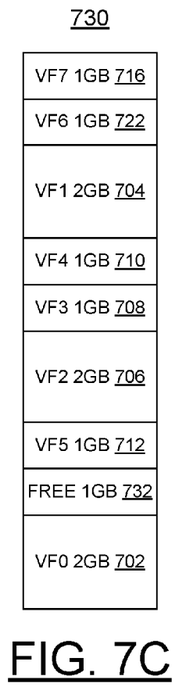
Figure 7D:
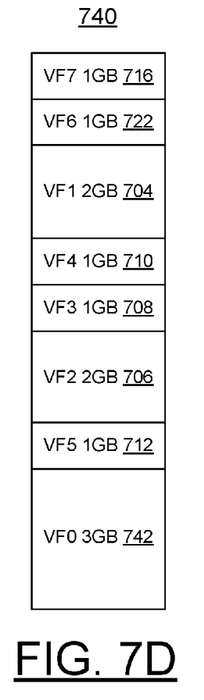

Referring to FIGS. 7A, 7B, 7C and 7D, there are shown example operations for implementing dynamic altering of Single Root Input/Output Virtualization (SRIOV) virtual function (VF) resources for the SRIOV adapter, with modifying resources of VFs whose DMA windows are not adjacent, which involves multiple TCE Table migrations in accordance with the preferred embodiment. In FIG. 7A, a memory TCE table pool arrangement generally designated by the reference character 700 includes VF0-VF7, 702, 704, 706, 708, 710, 712, 714, 716. In FIG. 7B, a memory TCE table pool arrangement generally designated by the reference character 720 includes VF0-VF5, VF7, 702, 704, 706, 708, 710, 712, 716 with VF6 722 modified to 1 GB providing Free 1 GB 724. In FIG. 7C, a memory TCE table pool arrangement generally designated by the reference character 730 includes VF0, 702, Free 1 GB 732, VF5, 712. VF2-VF4, 706, 708, 710, VF1, 704, VF6 722, and VF7 716. In FIG. 7D, a memory TCE table pool arrangement generally designated by the reference character 740 includes VF0, 742 of 3 GB, VF5, 712, VF2-VF4, 706, 708, 710, VF1, 704, VF6 722, and VF7 716. As shown in FIG. 7B, VF6, 722 is provided at a target configuration of 1 GB. As shown in FIG. 7C, VF5, 712 (1 GB) will be moved to temporary TCE Table, VF1, 704 (2 GB) will be moved to the free space after VF6, 722 (now 2 GB free Space), Move VF5, 712 to VF1 old space. As shown in FIG. 7D, VF0, 742 is provided additional required resources at a target configuration of 3 GB.

Figure 8:
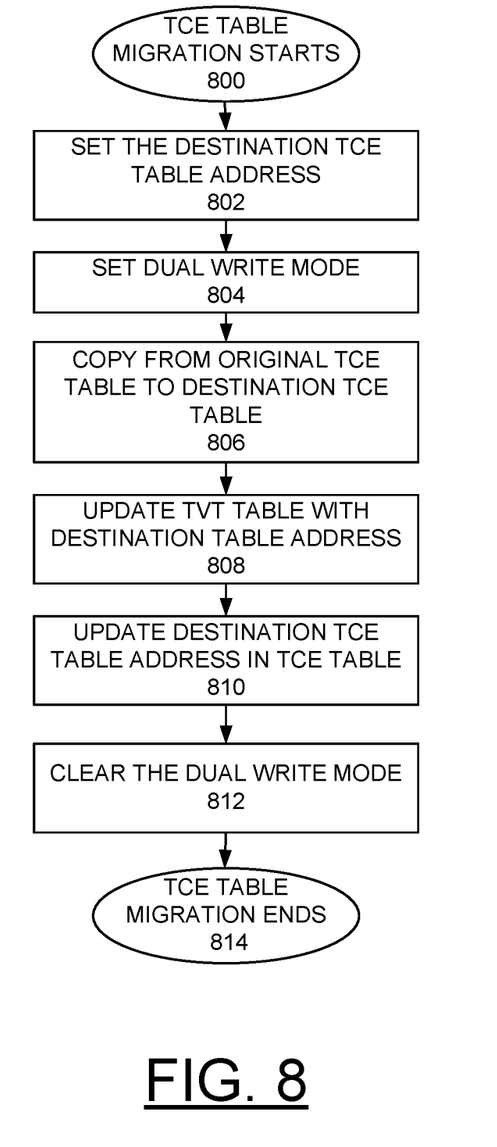
FIG. 8 is a flow chart illustrating example operations of an example TCE Table Migration procedure for implementing dynamic altering of Single Root Input/Output Virtualization (SRIOV) virtual function (VF) resources including direct memory access (DMA) windows without bringing down the VF for the SRIOV adapter in accordance with the preferred embodiment.

Referring to FIG. 8, there are shown example operations of a detailed TCE Table Migration procedure for implementing dynamic altering of Single Root Input/Output Virtualization (SRIOV) virtual function (VF) resources for the SRIOV adapter in accordance with the preferred embodiment.

In accordance with features of the invention, the hypervisor 116 supports the new implementation specific algorithm for garbage collection or TCE table movement to make the free space contiguous to the required DMA window. For example, in step 2 illustrated TCE table pool 720 in FIG. 7B may have TCE migrations as shown in FIG. 8.

In FIG. 8, TCE Table Migration starts as indicated at a block 800. The Destination TCE Table address is set in the TCE Table Header as indicated at a block 802. The dual write mode is set in the TCE Table Header as indicated at a block 804. As indicated at a block 806 copying the table contents from source TCE table to the destination TCE Table starts. Any writes to the TCE table during any stage of the copying, which may be initiated from LPARs would land in the hypervisor, and the hypervisor will write to both TCE Tables as the Dual Write mode is set in the TCE Table Header. All reads from the processor host bridge (PHB) 106 for any DMA would be directed to the original TCE table as in the existing art.

Once the copying is done, Translation Validation Table (TVT) is updated with the destination table address with atomic operation as indicated at a block 808. TCE Table Address in the TCE Table Header is updated with the destination TCE table address as indicated at a block 810. The Dual Write Mode in the TCE Table header is cleared as indicated at a block 812. TCE Table Migration ends as indicated at a block 814.

Figure 9:
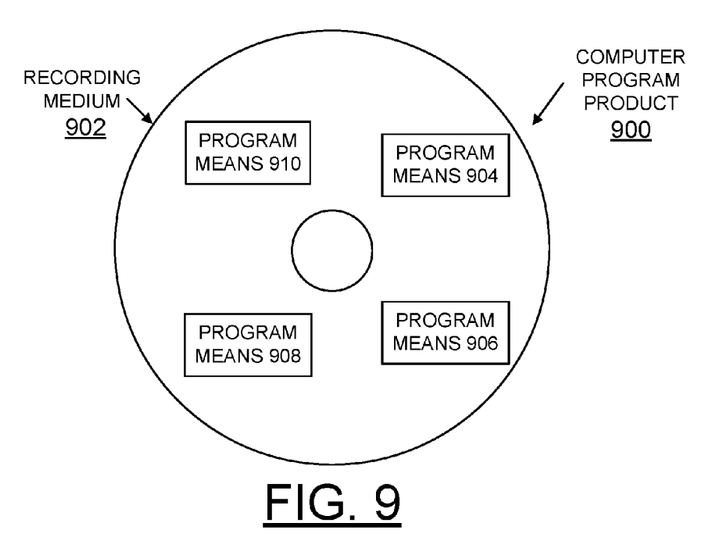
FIG. 9 is a block diagram illustrating a computer program product in accordance with the preferred embodiment.

Referring now to FIG. 9, an article of manufacture or a computer program product 900 of the invention is illustrated. The computer program product 900 is tangibly embodied on a non-transitory computer readable storage medium that includes a recording medium 902, such as, a floppy disk, a high capacity read only memory in the form of an optically read compact disk or CD-ROM, a tape, or another similar computer program product. Recording medium 902 stores program means 904, 906, 908, and 910 on the medium 902 for carrying out the methods for implementing dynamic altering of Single Root Input/Output Virtualization (SRIOV) virtual function (VF) resources for the SRIOV adapter of a preferred embodiment in the computer system 100 of FIG. 1.

A sequence of program instructions or a logical assembly of one or more interrelated modules defined by the recorded program means 904, 906, 908, and 910, direct the computer system 100 for implementing dynamic altering of SRIOV virtual function (VF) resources including dynamic altering of DMA windows of a preferred embodiment.

While the present invention has been described with reference to the details of the embodiments of the invention shown in the drawing, these details are not intended to limit the scope of the invention as claimed in the appended claims.

What is claimed is:

1. A method for implementing dynamic altering of Single Root Input/Output Virtualization (SRIOV) virtual function (VF) resources including direct memory access (DMA) windows without bringing down the VF in a virtualized system, said method comprising:
   receiving a request to alter VF resources;
   completing pending DMA requests for the VF resources to be altered including resizing DMA windows;
   responsive to the completed pending DMA requests, allocating new buffers in resized DMA windows without bringing down the VF in the virtualized system; and
   migrating Translation Control Entry (TCE) tables using a Dual Write mode in a TCE table header, without affecting any live traffic of affected VFs.

2. The method as recited in claim 1, includes providing a Single Root Input/Output Virtualization (SRIOV) adapter with a plurality of virtual functions (VFs) and providing a physical function (PF) with the Single Root Input/Output Virtualization (SRIOV) adapter, said physical function containing said plurality of virtual functions (VFs), and wherein dynamic altering of the SRIOV virtual function (VF) resources including direct memory access (DMA) windows includes sending the DMA window change to a virtual function (VF) driver for the SRIOV virtual function (VF) to be altered.

3. The method as recited in claim 2, includes providing a hypervisor receiving a request to increase a virtual function (VF) DMA window size.

4. The method as recited in claim 3, includes said hypervisor determining position of a free DMA window to increase the virtual function (VF) DMA window size.

5. The method as recited in claim 4, includes said hypervisor based on the determined position of the free DMA window, using one or more Translation Control Entry (TCE) table migrations to make the free DMA window contiguous to the virtual function (VF) DMA window.

6. The method as recited in claim 1, includes migrating Translation Control Entry (TCE) tables for enabling the alteration of the VF resources without bringing down the VFs.

7. The method as recited in claim 1, includes providing a novel TCE Table header including said Dual Write Mode and a Destination TCE Table Address.

8. The method as recited in claim 1, includes setting a Destination TCE Table address in a TCE Table Header, setting a dual write mode in the TCE Table Header, and copying table contents from a source TCE table to a destination TCE Table.

9. The method as recited in claim 8, includes performing writes to the TCE table during any stage of the copying, to both the source TCE table and the destination TCE Table.

10. A system for implementing dynamic altering of Single Root Input/Output Virtualization (SRIOV) virtual function (VF) resources including direct memory access (DMA) windows without bringing down the VF in a virtualized system comprising:
   a Single Root Input/Output Virtualization (SRIOV) adapter comprising a plurality of virtual functions (VFs), and a physical function (PF) containing said plurality of virtual functions (VFs);
   a processor;
   a management function and a hypervisor managing functions associated with the SRIOV adapter including the SRIOV PF and VFs;
   said processor using said management function and said hypervisor to perform the steps of:
   receiving a request to alter VF resources;
   completing pending DMA requests for the VF resources to be altered including resizing DMA windows;
   responsive to completing the pending DMA requests, allocating new buffers for resized DMA windows without bringing down the VF in a virtualized system; and
   migrating Translation Control Entry (TCE) tables using a Dual Write mode in a TCE table header, without affecting any live traffic of affected VFs.

11. The system as recited in claim 10, wherein said management function and said hypervisor include control code tangibly embodied in a non-transitory machine readable medium used for implementing dynamic resizing of the SRIOV VF.

12. The system as recited in claim 10, said hypervisor further includes a respective virtual function (VF) device driver coupled to SRIOV VFs; and wherein said hypervisor communicates the request to alter VF resources to an associated SRIOV VF device driver.

13. The system as recited in claim 10, further includes said processor using said management function and said hypervisor to perform the steps of migrating Translation Control Entry (TCE) tables for enabling the alteration of the VF resources without bringing down the VFs.

14. The system as recited in claim 10, includes providing a novel TCE Table header including said Dual Write Mode and a Destination TCE Table Address.

15. The system as recited in claim 10, includes said hypervisor receiving a request to increase a virtual function (VF) DMA window size.

16. The system as recited in claim 10, includes said hypervisor determining position of a free DMA window to increase the virtual function (VF) DMA window size.

17. The system as recited in claim 16, includes said hypervisor based on the determined position of the free DMA window, using one or more Translation Control Entry (TCE) table migrations to make the free DMA window contiguous to the virtual function (VF) DMA window.

18. A system for implementing dynamic altering of Single Root Input/Output Virtualization (SRIOV) virtual function (VF) resources including direct memory access (DMA) windows without bringing down the VF in a virtualized system comprising:
   a Single Root Input/Output Virtualization (SRIOV) adapter comprising a plurality of virtual functions (VFs), and a physical function (PF) containing said plurality of virtual functions (VFs);
   a processor;
   a management function and a hypervisor managing functions associated with the SRIOV adapter including the SRIOV PF and VFs;
   said processor using said management function and said hypervisor to perform the steps of:
   receiving a request to alter VF resources;
   completing pending DMA requests for the VF resources to be altered including resizing DMA windows;
   responsive to completing the pending DMA requests, allocating new buffers for resized DMA windows without bringing down the VF in a virtualized system; and
   setting a Destination Translation Control Entry (TCE) Table address in a TCE Table Header, setting a dual write mode in the TCE Table Header, and copying table contents from a source TCE table to a destination TCE Table.

* * * * *